United States Patent
Galitsky

(12) 
(10) Patent No.: US 11,386,176 B2
(45) Date of Patent: Jul. 12, 2022

(54) INFERRING LOGICAL CLAUSES FOR ANSWERING COMPLEX MULTI-HOP OPEN DOMAIN QUESTIONS

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 102 days.

(21) Appl. No.: 16/983,993

(22) Filed: Aug. 3, 2020

(65) Prior Publication Data

US 2021/0216601 A1 Jul. 15, 2021

Related U.S. Application Data

(60) Provisional application No. 62/960,577, filed on Jan. 13, 2020.

(51) Int. Cl.
*G06F 17/00* (2019.01)
*G06F 7/00* (2006.01)
(Continued)

(52) U.S. Cl.
CPC .... *G06F 16/9535* (2019.01); *G06F 16/24564* (2019.01); *G06F 16/9024* (2019.01);
(Continued)

(58) Field of Classification Search
CPC ........... G06F 16/9535; G06F 16/90332; G06F 16/24564; G06F 16/9024; G06N 20/00; G06N 5/04
(Continued)

(56) References Cited

U.S. PATENT DOCUMENTS 10,699,708 B2 * 6/2020 Lecue ..................... G10L 15/22
2015/0185996 A1 * 7/2015 Brown .................... G06F 3/167
715/706

(Continued)

OTHER PUBLICATIONS

Baral, Knowledge Representation, Reasoning and Declarative Problem Solving, Cambridge University Press, 2003.
(Continued)

*Primary Examiner* — Pavan Mamillapalli
(74) *Attorney, Agent, or Firm* — Kilpatrick Townsend & Stockton LLP

(57) ABSTRACT

Systems, devices, and methods discussed herein provide improved autonomous agent applications that are configured to generate automated answers to a complex query (e.g., a query that includes more than one search parameter). A user query comprising a complex query may be received and decomposed into a number of simple queries. A simple query may be executed with a search engine to obtain a set of search results. An answer for the simple query may be obtained from the search results and then substituted for a term of the next simple query identified from the complex query. The next simple query may then be executed to obtain another set of search results. These steps may occur any suitable number of times. An answer for the complex query may be generated based at least in part on the answers one or more of the simple queries.

20 Claims, 10 Drawing Sheets

(51) Int. Cl.

| | |
|---|---|
| *G06F 16/9535* | (2019.01) |
| *G06F 16/901* | (2019.01) |
| *G06N 5/04* | (2006.01) |
| *G06F 16/9032* | (2019.01) |
| *G06N 20/00* | (2019.01) |
| *G06F 16/2455* | (2019.01) |

(52) U.S. Cl.
CPC ......... *G06F 16/90332* (2019.01); *G06N 5/04* (2013.01); *G06N 20/00* (2019.01)

(58) Field of Classification Search
USPC .......................................................... 707/706
See application file for complete search history.

(56) References Cited

U.S. PATENT DOCUMENTS

| | | | | |
|---|---|---|---|---|
| 2018/0060359 | A1* | 3/2018 | Li | G06F 16/24578 |
| 2018/0129739 | A1* | 5/2018 | Jones | G06F 16/9027 |
| 2019/0199658 | A1* | 6/2019 | Kim | G06F 16/90332 |
| 2020/0028803 | A1* | 1/2020 | Helmy | H04M 3/5191 |
| 2020/0114207 | A1* | 4/2020 | Weldemariam | H04L 67/306 |

OTHER PUBLICATIONS

Baral et al., Using Answer Set Programming to Answer Complex Queries, In:Workshop on pragmatics of question answering at HLT-NAAC2004, 2004, 6 pages.

De Cao, Question Answering by Reasoning Across Documents with Graph Convolutional Networks, Proceedings of the 2019 Conference of the North American Chapter of the Association for Computational Linguistics: Human Language Technologies, vol. 1 (Long and Short Papers), N19-1240, Jun. 2019, 12 pages.

Galitsky et al., Applying Hybrid Reasoning to Mine For Associative Features In Biological Data, Journal of Biomedical Informatics, vol. 40, Issue 3, Jun. 2007, pp. 203-220.

Galitsky, Merging Deductive and Inductive Reasoning for Processing Textual Descriptions of Inter-Human Conflicts, Journal of Intelligent Information Systems, vol. 27, No. 1, Jul. 2006, pp. 21-48.

U.S. Appl. No. 16/426,878, "Automated Building of Expanded Datasets for Training of Autonomous Agents," filed on May 30, 2019, 95 pages.

Harel et al., Learning Novelty-Aware Ranking of Answers to Complex Questions, WWW'19: The World Wide Web Conference, May 2019, pp. 2799-2805.

Katzouris et al., Incremental Learning of Event Definitions with Inductive Logic Programming, Machine Learning, vol. 100, No. 2-3, Jun. 2015, pp. 555-585.

Kratzwald et al., Adaptive Document Retrieval for Deep Question Answering, In Proceedings of the Conference on Empirical Methods in Natural Language Processing (EMNLP), Oct.-Nov. 2018, pp. 576-581.

Min et al., Efficient and Robust Question Answering from Minimal Context over Documents, ACL, 2018, pp. 1725-1735.

Min et al., Multi-Hop Reading Comprehension Through Question Decomposition and Rescoring, ACL, 2019, 13 pages.

Mitra et al., Addressing a Question Answering Challenge by Combining Statistical Methods with Inductive Rule Learning and Reasoning, Association for the Advancement of Artificial Intelligence, 2016, 7 pages.

Muggleton, Inductive Logic Programming, New Generation Computing, vol. 8, 1991, pp. 295-318.

Qi et al., Answering Complex Open-domain Questions Through Iterative Query Generation, Proceedings of the 2019 Conference on Empirical Methods in Natural Language Processing and the 9th International Joint Conference on Natural Language Processing, 2019, pp. 2590-2602.

Ray, Nonmonotonic Abductive Inductive Learning, Journal of Applied Logic, vol. 7, Issue 3, Sep. 2009, pp. 329-340.

* cited by examiner

600

| | |
|---|---|
| INFORMAL REASONING IDENTIFYING THE BRIDGE ENTITY TO COMPLETE THE 2ND-HOP QUESTION | Q: Which rocket was used to launched the first human in space<br>P1: The USSR launched the first human in space, Yuri Gagarin ...<br>P2: Yuri Gagarin was launched into a single orbit on a Vostok 3KA rocket, on 12 April 1961. |
| COMPARING TWO ENTITIES (COMPARISON) | Q: What is a comparative number of components in sand and glass.<br>P1: The most common component of sand is silicon dioxide in the form of quartz.<br>P2: Silica sand is the main component of glass as glass contains about 70% silica by weight. Soda is added during the glassmaking process |
| LOCATING THE ANSWER ENTITY BY CHECKING MULTIPLE PROPERTIES | Q: Which former member of the Pittsburgh Pirates was nicknamed "The Cobra"?<br>P1: Several current and former members of the Pittsburgh Pirates ... John Milner, Dave Parker, and Rod Scurry...<br>P2: David Gene Parker, nicknamed "The Cobra", is an American former player in Major League Baseball... |
| INFORMAL REASONING ABOUT THE PROPERTY OF AN ENTITY IN QUESTION THROUGH A BRIDGE ENTITY | Q: Near what city is the deepest cave in the world located<br>P1: The deepest cave in the world, Veryovkina cave, is located in the Arabika mountain ridged with Karst thickness exceeding ...<br>P2: Arabika massif is north from the Abkhazian city of Gagra |
| INFORMAL REASONING THAT REQUIRE MORE THAN TWO SUPPORTING FACTS | Q: 'Other than Yodobashi, what other towns were merged into the ward which gave the major Japanese retail chain specializing in electronics, PCs, cameras, and photographic equipment it's name?<br>P1: ... the towns of Yodobashi, Okubo, Totsuka, and Ochiai town were merged into Yodobashi ward. ... Yodobashi Camera is a store with its name taken from the town and ward.<br>P2: Yodobashi Camera Co., Ltd. is a major Japanese retail chain specializing in electronics, PCs, cameras and photographic equipment. |
| FORMAL REASONING INVOLVING CLAUSES | Q: How does John qualify for an exemptions from the fee for not having coverage<br>P1: You had a financial hardship or other circumstances that prevented you from getting health insurance<br>P2: You lived in a state that didn't expand its Medicaid program and your household income was below 138% of the federal poverty level<br>Clause1: exemption(P, not(insured(P)) :- hardship(P, financial), prevent(hardship(P, financial), P, insured(P)).<br>Facts: hardship(john, financial), prevent(hardship(john, financial), john, insured(john)). |

*FIG. 6*

INFERRING LOGICAL CLAUSES FOR ANSWERING COMPLEX MULTI-HOP OPEN DOMAIN QUESTIONS

CROSS-REFERENCE TO RELATED APPLICATIONS

This non-provisional application claims priority to U.S. Patent Application No. 62/960,577, filed on Jan. 13, 2020, the disclosure of which is herein incorporated by reference in its entirety for all purposes.

TECHNICAL FIELD

This disclosure is generally concerned with linguistics. More specifically, this disclosure relates to using providing answers that include explanations to user submitted questions.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

BRIEF DESCRIPTION OF THE DRAWINGS

FIG. 6 depicts a variety of types of complex multi-hop questions, in accordance with at least one embodiment.

DETAILED DESCRIPTION

Figure 1:
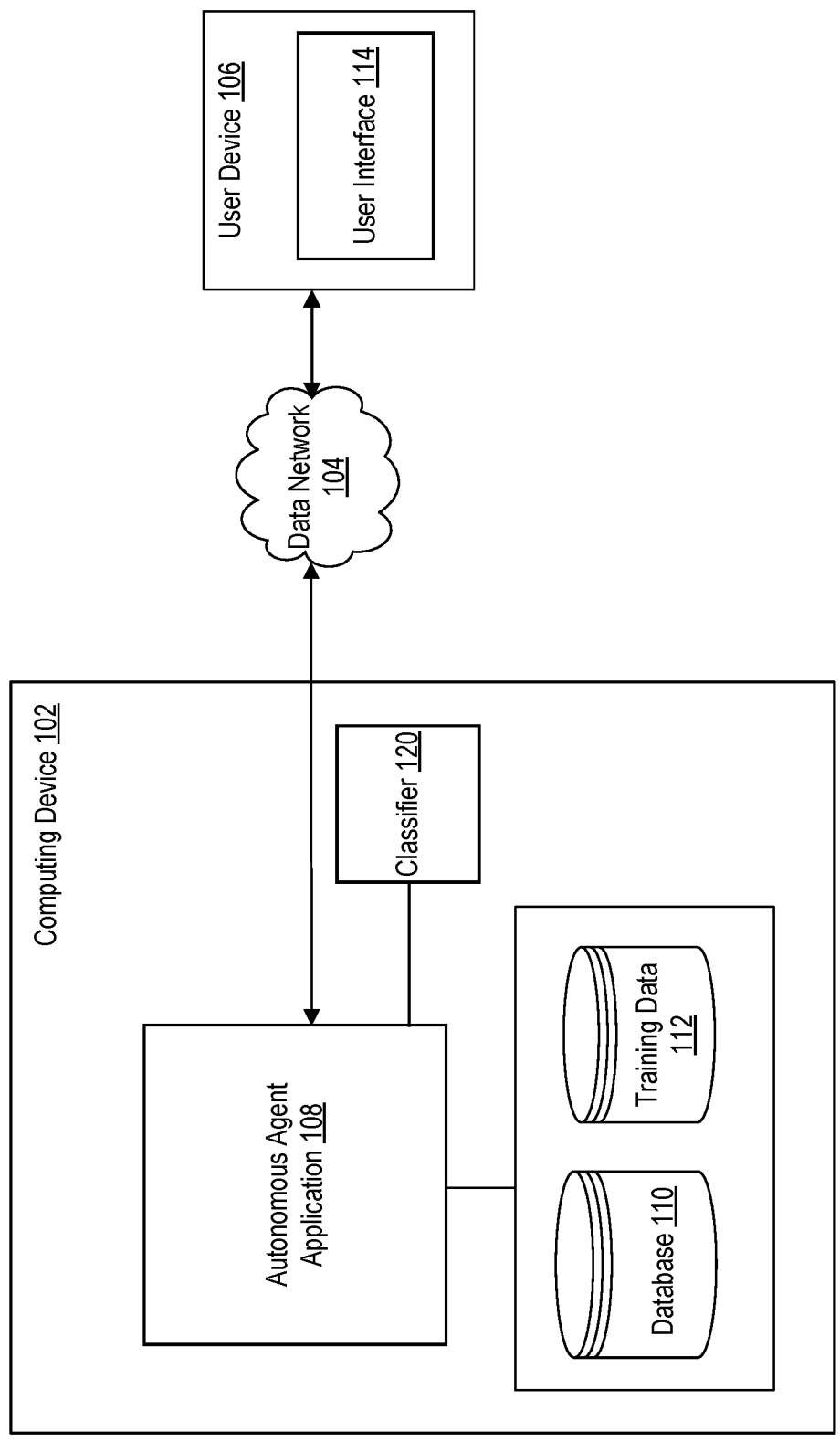
FIG. 1 depicts an autonomous agent environment, in accordance with at least one embodiment.

Aspects of the present disclosure relate to generating automated answers to complex queries. As used herein, a "complex query" (also referred to as a complex multi-hop question) may refer to a query that comprises more than one search parameter.

Answering complex questions is a time-consuming activity that requires navigation through, reasoning about, and integration of information. Machine reading comprehension (MRC) techniques have succeeded in answering simple questions within a document of a limited size, but answering complex questions is still an ongoing challenge. In some embodiments, an answer may be automatically generated based at least in part on deriving some knowledge from data by means of induction (e.g., generalization from knowledge extracted from text) or deduction (e.g., applying reasoning rules to knowledge extracted from text and formalized). Further information regarding "generalization" (also referred to as "pair-wise generalization" can be found in U.S. patent Ser. No. 16/426,878, entitled "Automated building of expanded datasets for training of autonomous agents," which is herein incorporated by reference in its entirety for all purposes. Induction is also referred to as "learning clauses from data," and should not be confused with learning associations between questions and answers which are expected to be applied to existing answers. A framework for answering broad and complex questions, both factoid and non-factoid is presented herein. This framework utilizes a search engine application programming interface (API) and/or MRC techniques. The techniques discussed herein decompose complex, compound questions into a sequence of simpler questions, and compute the final answer from the sequence of corresponding answers.

The techniques disclosed herein improve conventional Question Answering (Q/A) systems by providing formal reasoning that relies on clauses learned from texts and on complex question decomposition into simple queries that can then be executed against various sources (e.g., a local index, an intranet, the Internet, etc.). Reasoning, multi-hop querying, and machine reading comprehension (MRC) may be integrated so that a value can be extracted from a search result of one simple query and substituted into another simple query, as many times as pertinent until the answer is obtained via the recomposition of the corresponding answers to the simple queries. This approach increases Q/A performance in domains and may be utilized to train a deep learning (DL) Q/A system to answer complex, multi-hop queries. The proposed architecture with the focus on formal reasoning is well suited for industrial applications where performance is guaranteed in cases of no or limited training sets.

Conventional techniques for open-domain question answering largely include architectures in which candidate answers are shortlisted using TF*IDF techniques and then a deep learning (DL) model is used to find the exact answer. Some systems have followed this approach where retrieval is followed by MRS. However, these two-step retrieve-and-MRC approaches are limited to simpler factoid questions. A "factoid question" is a question that can be concisely answered with simple facts expressed in short text answers (e.g., one or more word answers). For example, questions like, "what is a female deer called?", "who discovered gravity?", and the like are examples of factoid questions. A "non-factoid question" is intended to refer to questions that are not factoid questions. The disadvantage of these fixed two steps is that they do not accommodate multi-hop reasoning well, especially when the necessary facts have not been retrieved at the first step.

Many Q/A tasks require world knowledge that is not present in the text being searched or a training dataset to successfully answer a question. The techniques described herein differ from the conventional approaches to multi-hop querying. For example, rather than relying on learning query execution planning, a rule-based and clause-based reasoning system is employed which is configured to determine where to look for answers and/or values next. The system employs deduction to infer new clauses and attempts to associate existing answers with the question. If it fails, inductive reasoning yields new clauses which can in turn be employed by deduction. Based on inductive reasoning, an ontology of sets of clauses may be built from documents. This ontology may be utilized to support answering complex questions that lack explicit information or direct answers. The techniques described herein may utilize a search engine API to answer intermediate decomposed queries, if necessary.

FIG. 1 depicts autonomous agent environment 100, in accordance with at least one embodiment.

FIG. 1 depicts computing device 102, data network 104, and user device 106. The computing device 102 may further include database 110 and training data 112. User device 106 may include user interface 114. Training data 112 may be utilized to train classifier 120 to identify answers from corresponding queries provided at user interface 114.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

The classifier 120 may be previously trained by the computing device 102 and/or any suitable system to identify output data from input data. The classifier 120 may include one or more predictive models, classification models, neural networks, and so on. In some embodiments, classifier 120 may be trained utilizing any suitable supervised learning algorithm in which a function (e.g., a model) is trained to identify output (e.g., an answer) from provided input (e.g., a simple and/or complex query) based at least in part on a training data set including input/output pairs (e.g., other input data previously paired with corresponding output decisions). The classifier 120 can be utilized in any suitable context to provide any suitable decision from input data. In some embodiments, the autonomous agent application 108 may be configured to train the classifier 120 from training data 112 (e.g., a number of example question (input)/answer (output) pairs), or the autonomous agent application 108 may obtain the (already trained) classifier 120 from memory or another system. In some embodiments, the output (e.g., an answer) provided by the classifier 120 may include a decision log which includes the specific factors (e.g., specific user data) which influenced the decision of which answer to provide. In some embodiments, the output may be stored in database 110 and/or the input utilized by the classifier 120 and the corresponding output provided by the classifier 120 may be stored as additional training data within training data 112.

In an example, autonomous agent application 108 receives one or more user queries from user device 106 (e.g., via user interface 114). In some embodiments, a user query can comprise a complex query (e.g., a question that includes more than one search parameter such as "Who was the director of the film that won best-picture in 2020?" Autonomous agent application 108 may be configured to parse the query into multiple simple queries. A first simple query (e.g., "What film won best picture in 2020?") can be utilized with a search engine API to obtain a first answer (e.g., movie A). The answer (e.g., movie A) may then be inserted in another simple query (e.g., "Who was the director of the film movie A?") and then utilized with a search engine API to obtain a second answer. This process may be performed iteratively as many times as there are simple queries.

Figure 2:
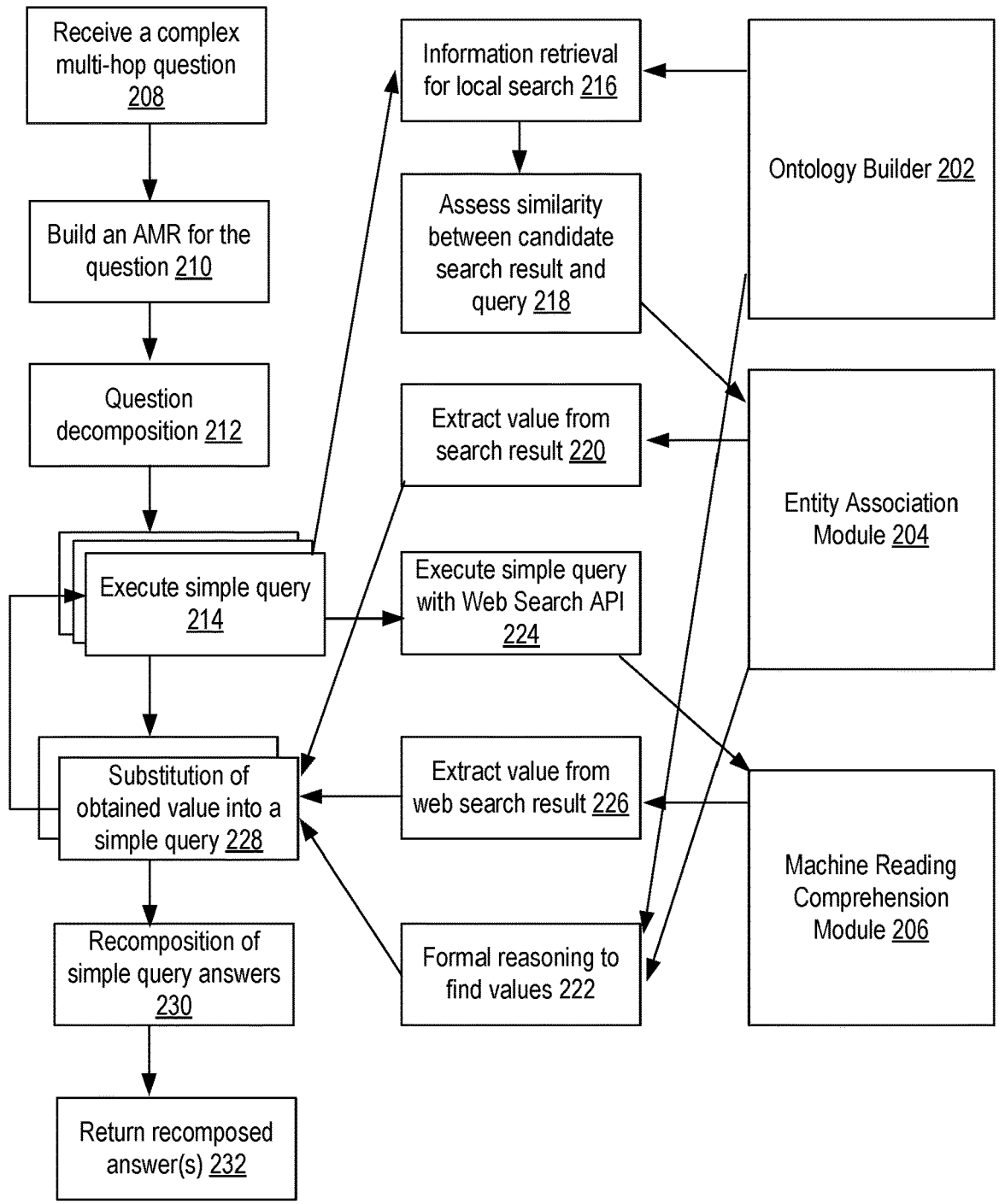
FIG. 2 depicts an example architecture and flow for a system that is configured to answer complex multi-hop questions, in accordance with at least one embodiment.

FIG. 2 depicts an example architecture and flow for a system 200 that is configured to answer complex multi-hop questions, in accordance with at least one embodiment. The left-most column of boxes present the processing steps of the flow. On the far right, a number of computing components of the system 200 are depicted, including ontology builder 202, entity association module 204, and machine reading comprehension module 206. Ontology builder 202 and entity association module may be utilized to produce domain-specific clauses from available sources such as a corpus of text and the web offline and/or at search time. Machine reading comprehension module 206 may be configured to execute any suitable algorithm for reading and extracting knowledge from unstructured text.

Figure 3:
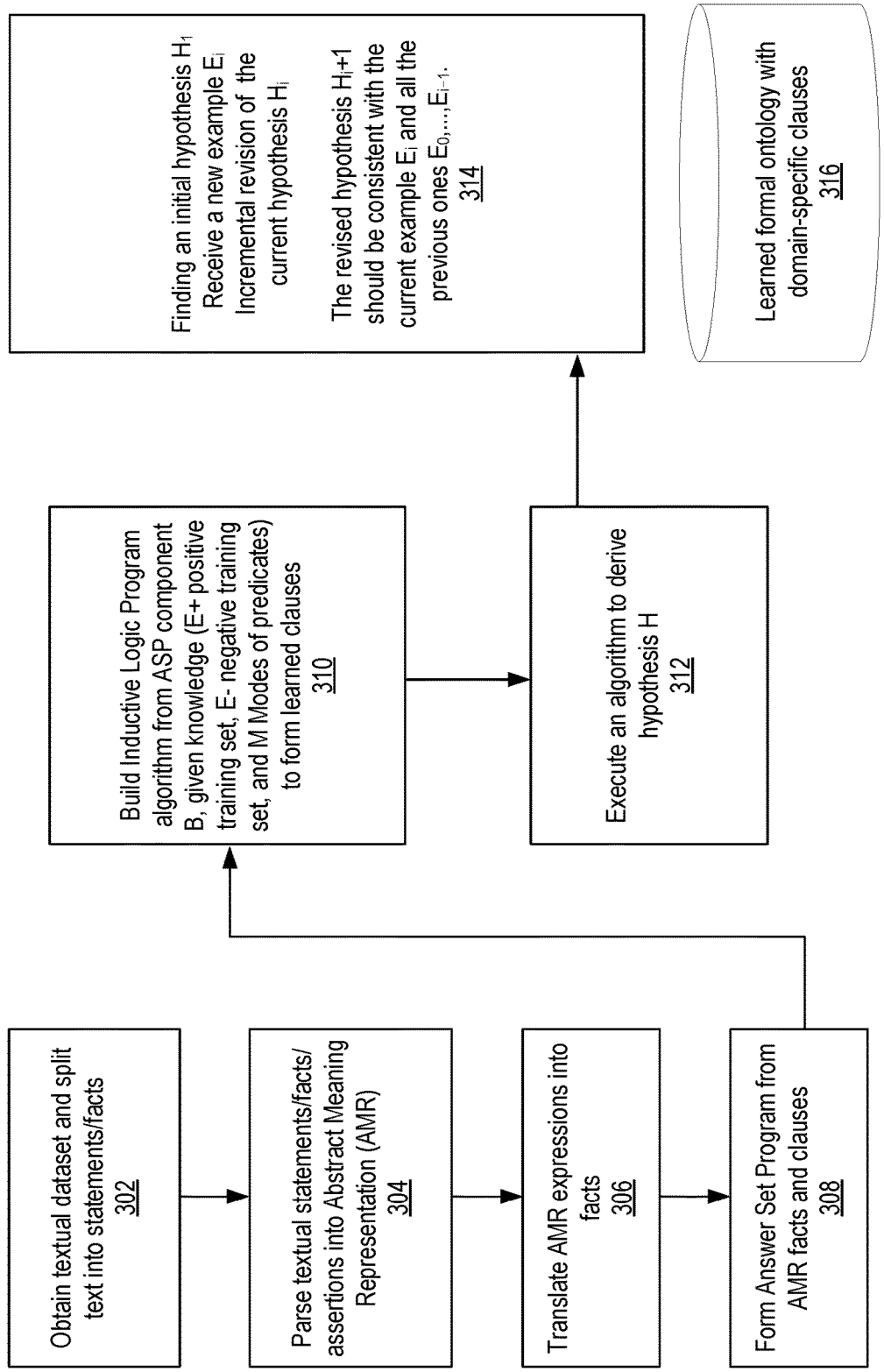
FIG. 3 depicts a process performed by an ontology builder for generating a learned formal ontology with domain-specific clauses, in accordance with at least one embodiment.

FIG. 3 depicts a process 300 performed by an ontology builder (e.g., the ontology builder 202 of FIG. 2) for generating a learned formal ontology with domain-specific clauses, in accordance with at least one embodiment. In the process 300, ontology builder 202 takes tagged texts and attempts to generalize from them to build clauses, which will be a basis of inductive and deductive reasoning in the course of a Q/A session. In some embodiments, process 300 may be performed as an offline process (e.g., prior to a query being provided) although in other embodiments, the process 300 may be an online process.

Generally, in process 300, ontology builder 202 takes tagged texts as input and produces rules formed from data in the form of clauses. The dataset of texts may include a target feature, a positive set of texts and a negative set of texts. Ontology builder 202 builds rules to infer this target feature, based on the hypotheses of logical induction: common features D shared by the positive set imply this target feature, and common feature shared by the negative set must be excluded from D. The value of an ontology that includes clauses instead of just relations between entities is that it can perform deductive as well as inductive reasoning (that is essential for complex Q/A).

The process 300 may begin at 302, where ontology builder 202 obtains a textual dataset and splits the text into statements and facts (e.g., segments). These textual statements and facts may be parsed to generate an abstract meaning representation (AMR) of each segment at 304 utilizing any suitable algorithm for generating an abstract meaning representation from textual input. One consequence of converting a statement/fact to its AMR representation is that by doing so, the core facets of meaning of the statement/fact may be captured while abstracting away idiosyncratic syntactic facts. For example, she adjusted the machine and she made an adjustment to the machine may share the same AMR.

Figure 4:
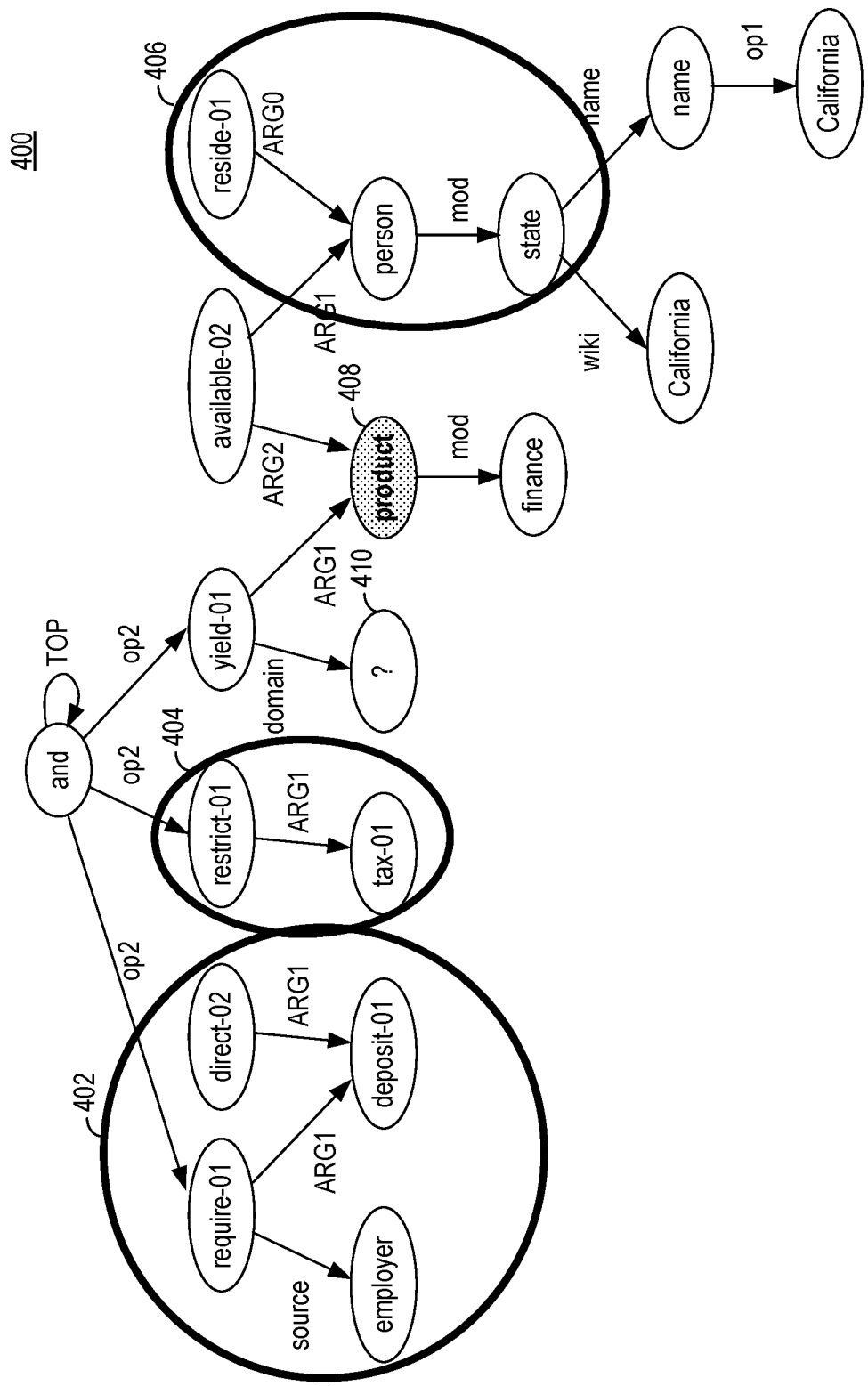
FIG. 4 depicts an abstract meaning representation for a complex question, in accordance with at least one embodiment.

FIG. 4 depicts an abstract meaning representation 400 for a complex question, in accordance with at least one embodiment. Abstract meaning representation 400 may be a directed acyclic graph comprising a plurality of nodes and edges that specify a semantic representation of the complex query. The abstract meaning representation 400 may be traversed/navigated according to a predefined set of rules to identify multiple simple queries (e.g., in this case, three simple queries). The three circles 402, 404, and 406 indicate three simple queries that the main query can be decomposed into. The main entity of the AMR is "product" (e.g., represented by node 408). The attribute of the product in question is shown at node 410 (e.g., by question mark). In some cases, using an AMR of text can help in query decomposition.

Returning to FIG. 3, at 306, ontology builder 202 may translate the AMR expressions into facts expressed in first order logic (e.g., situation calculus). By way of example, Table 1, provided below is an example of a task that requires deductive reasoning.

TABLE 1

Narrative:
'Mary grabbed the expense report.'
'Mary traveled to the accountant office.'
'Mary took the application form there.'
Q: 'What is Mary carrying?' A: 'expense report' & 'application form'
'Mary left the expense report.'
'Daniel went back to the invoice department.'
Q: 'What is Mary carrying?' A: 'application form'
Narrative represented in situation calculus:
happensAt(grab(mary, expense_r),1). happensAt(travel(mary,office),2).
happensAt(take(mary,app_form),3). happensAt(leave(mary, expense_r),5).
happensAt(go back(daniel, invoice_dept),6).
Annotation:
holdsAt(carry(mary, expense_r),4). holdsAt(carry(mary, ),3).
happensAt(leave(mary, expense_r),5). happensAt(go back(daniel, invoice_dept),4). holdsAt(carry(mary, app_form),7). not holdsAt(carry(mary, expense_r),7).

The narratives in Table 1 describe that the event of grabbing an expense_r by Mary has happened at time point 1, then another event named travel has happened at time point 2 and so on. The first two annotations state that both the fluents specifying Mary is carrying an app_form and Mary is carrying an expense_r holds at time point 3. The not holdsAt annotation states that at time point 7 Mary is not carrying a expense_r.

The is a number of tasks they may have a clear reasoning behind their actions. For example, the knowledge needed to answer the previous question 'Which report does Mary need to submit?' is clear and can be described formally. Formalization can utilize simple event calculus which can include, but is not limited to, the following predicates and axioms (e.g., facts):

| Predicate | Meaning |
|---|---|
| happensAt(F,T) | Event E occurs at time T |
| initiatedAt(F,T) | At time T a period of time for which fluent F holds is initiated |
| terminatedAt(F,T) | At time T a period of time for which fluent F holds is terminated |
| holdsAt(F,T) | Fluent F holds at time T |
| | holdsAt(F, T + 1) ← initiatedAt(F, T). |
| | holdsAt(F, T), not terminatedAt(F, T). |
| | Axioms/Facts |
| | holdsAt(F, T + 1) ← initiatedAt(F, T). |
| | holdsAt(F, T), not terminatedAt(F, T). |

At 308, ontology builder 202 may build an answer set program (ASP) from the AMR facts. An answer set program (ASP) is a collection of rules of the form, $L_0 \leftarrow L_1, \ldots, L_m$, not $L_{m+1}, \ldots,$ not $L_n$ where each of the $L_i$'s is a literal in the sense of a classical logic. Intuitively, the above rule means that if $L_1, \ldots, L_m$ are true and if $L_{m+1}, \ldots, L_n$ can be safely assumed to be false then $L_0$ must be true. The left-hand side of an ASP rule, $L_0$ is called the head and the right-hand side is called the body. The semantics of ASP is based on the stable model (answer set) semantics of logic programming. For example, Rule 1 may indicate:

initiatedAt(carry(A,O),T) ← happensAt(take(A,O),T)

The above rule represents the knowledge that the fluent carry(A,O), denoting A is carrying O, gets initiated at time point T if the event take(A,O) occurs at T. As used herein, predicates and ground terms in logical formulae start with a lower case letter, while variable terms start with a capital letter. A rule with no head is referred to as a "constraint". A rule with empty body is referred to as a "fact". An answer set program P containing the above rule (Rule 1) and the axioms of event calculus (from Table 1) along with the fact happensAt(take(mary,expense_r),1)

logically entails (|=) that mary is carrying a expense_r at time point 2 i.e. holdsAt(carry(mary,expense_r),2). Since it can be safely assumed that mary is not carrying a expense_r at time point 1, P 6|=holdsAt(carry(mary, expense_r),1).

It should be noted that it is also true that P|=holdsAt(carry (mary,expense_r),3), due to the axioms in Table 1. However, if the following two rules are added in the program P:

terminatedAt(carry(A,O),T) ← happensAt(drop(A,O),T).
happensAt(drop(marry, expense_r),2).

then the new program P will no longer entail holdsAt(carry (mary,expense_r),3) due the axioms of event calculus. This is an example of non-monotonic reasoning when adding more knowledge changes one's previous beliefs and such thing is omnipresent in human reasoning. First order logic does not allow non-monotonic reasoning and this is one of the reasons why the ASP language may be utilized as the formal reasoning language.

At 310, the ontology builder 202 builds an inductive logic program from the ASP component B (e.g., the ASP formed at 308). Inductive Logic Programming (ILP) is a subfield of machine learning that is focused on learning logic programs. Given a set of positive examples $E^+$, negative examples $E^-$ and some background knowledge B, an ILP algorithm finds a Hypothesis H (answer set program) such that B∪H|=$E^+$ and not (B∪H|=$E^-$).

The possible hypothesis space is often restricted with a language bias that is specified by a series of mode declarations M. A head(s) declaration denotes a literal s that can appear as the head of a rule. A body(s) declaration denotes a literal s that can appear in the body of a rule. The arguments is called schema and comprises of two parts: 1) An identifier for the literal 2) A signature of a literal (e.g., a list of placemakers for each argument). A placemaker is either +type (input), −type (output) or #type (constant), where type denotes the type of the argument. An answer set rule is in the hypothesis space defined by L (call it L(M)) if its head (and each of its body literals) is constructed from the schema s in a head(s) (or in a body(s)) in L(M) as follows: 1) by replacing an output (−) placemaker by a new variable, 2) by replacing an input (+) placemaker by a variable that appears in the head or in a previous body literal, and 3) by replacing a ground (#) placemaker by a ground term.

head(initiatedAt(carrying(+arg$_1$,+arg$_3$),+time))
head(terminatedAt(carrying(+arg$_1$,+arg$_3$),+time))
body(happensAt(grab(+arg$_1$,+arg$_2$),+time))
body(happensAt(take(+arg$_1$,+arg$_3$),+time))
body(happensAt(go_back(+arg$_1$,+arg$_2$),+time))
body(happensAt(leave(+arg$_1$,+arg$_3$),+time))

Rule 1 of the previous section is in this L(M) and so is the fact, initiated(carrying(A,O),T). However, the following rule is not in L(M)): initiatedAt(carrying(A,O),T)←happensAt (take(A,O),T⁰).

The set E⁻ is required to restrain H from being over generalized. Informally, given a ILP task, an ILP algorithm finds a hypothesis H that is general enough to cover all the examples in E⁺ and also specific enough so that it does not cover any example in E⁻. Without E⁻, the learned H will contain only facts. In this case study, negative examples are automatically generated from the positive examples by assuming the answers are complete, (i.e. if a Q/A pair says that at a certain time point mary is carrying a expense_r it can be assumed that mary is not carrying anything else at that time stamp).

By way of example, ontology builder 202 may learn an answer set program based at least in part on an eXtended Hybrid Abductive Inductive Learning (XHAIL) algorithm that combines deductive (consequence-based), abductive (assumption-based), and inductive (generlization-based) inference types within a common logical framework. Given an ILP task ILP(B,E)={E⁺∪E⁻},M), generated at 310, an algorithm (e.g., XHAIL) may be executed at 312 to derive the hypothesis H. In this example, B contains both the axioms of SDEC and the narratives from Table 1. The set E comprises of the annotations from Table 1 which includes three positive examples and one negative example. M is the set of mode declarations above.

By way of example, the XHAIL algorithm may be utilized to identify a set of ground (variable free) atoms $\Delta = \cup_{i=1}^{n} \alpha_i$ such that B∪Δ|=E where each $\alpha_i$ is a ground instance of the head(s) declaration atoms. In this exemplary ILP problem there are two head declarations. Thus, the set Δ can contain ground instances of only those two atoms described in two head declarations. One possible Δ is shown below that meets the above requirements for the ILP task for the ongoing example:

Δ={ initiatedAt(carry(mary, expense_r)), 1), initiatedAt (carry(mary, app_form)), 3), terminatedAt(carry(mary, expense_r)), 5) }

In step 2, XHAIL computes a clause $\alpha_i \leftarrow \delta_i^{1} \ldots \delta_i^{mi}$ for each $\alpha_i$ in Δ, where B ∪Δ|=$\delta_i^j$, 1≤i≤n, 1≤j≤$m_i$, and each clause $\alpha_i \leftarrow \delta_i^{1} \ldots \delta_i^{mi}$ is a ground instance of a rule in L(M). In the running example, Δ contains three atoms that each must lead to a clause $k_i$, i=1,2,3. The first atom $\alpha_1$=initiatedAt(carry(mary, expense_r), 1) is initialized to the head of the clause $k_1$. The body of $k_1$ is saturated by adding all possible ground instances of the literals in body(s) declarations that satisfy the constraints mentioned above. There are six ground instances (all the narratives) of the literals in the body(s) declarations; however only one of them, i.e. happensAt(grab(mary,expense_r), 1), can be added to the body due to restrictions enforced by L(M). The set of all the ground clauses K can be constructed and their variabilized (uninstantiated) version $K_v$ is obtained by replacing all input and output terms by variables.

K:
initiatedAt(carry(mary, expense_r),1←happensAt(grab(mary, expense_r), 1).
initiatedAt(carry(mary, app_form), 3) ← happensAt(take(mary, app_form), 3).
terminatedAt(carry(mary, expense_r), 6) ← happensAt(leave(mary, app_form), 6).
$K_v$:

initiatedAt(carry(X, Y ), T) ← happensAt(grab(X, Y ), T).
initiatedAt(carry(X, Y ), T) ← happensAt(take(X, Y ), T).
terminatedAt(carry(X, Y ), T) ← happensAt(leave(X, Y ), T).

In step 3, XHAIL seeks to find a "compressed" theory H by deleting from $K_v$ as many literals (and clauses) as possible while ensuring that B∪H|=E. In the running example, working out this problem will lead to H=$K_v$.

The discovery of a hypothesis H depends on the choice of Δ. Since the value of that satisfies the constraints described in Step 1 is not unique, an iterative deepening strategy may be employed to select Δ of progressively increasing size until a solution is found. Furthermore, in Step 2 of XHAIL the algorithm was restricted to consider only those ground instances of body declarations that are not from the future time points. This method works when the size of the example is small. However, when a dataset contains thousands examples each comprising a set of narrative and annotations, versions of Δ grow extremely fast. This scaling issue can be handled by learning rules from each example and then using the learned rules to learn new rules from yet unsolved examples. For example, at 314 an incremental learning of Event Definitions (ILED) algorithm, can be used to address the scalability issue. After finding an initial hypothesis $H_1$ by XHAIL at 312, the ILED algorithm incrementally revises the current hypothesis $H_i$ when subjected to a new example $E_i$ so that the revised hypothesis $H_{i+1}$ is consistent with the current example $E_i$ and all the previous ones $E_0, \ldots, E_{i-1}$. It is natural to assume that ILED can scale up to this dataset.

The resulting domain specific clauses may be stored as part of a learned formal ontology in a data store 316 and subsequently used for answering complex questions.

Table 2 provides another example concerning reasoning about actions and states.

TABLE 2

Being a college candidate, To get accepted to the preparatory_math_tutorial1 you need to file form for pt1
Once pt1 is filed it needs to be approved2
To get accepted to theor_physics_module3 once pt1 is approved, you need to write an application4
To get accepted to the preparatory_math_tutorial1
preparatory_math_tutorial1 needs to be successfully passed to proceed to theor_physics_module3
Knowledge of basic physics is required for theor_physics_module3
Q: Once you have pt1 filed, what do you need to do to enroll in theor_physics_module3?
A: pass the approval, write an application An ILP problem can be built as depicted below in Table 3.

Input
Narrative
holdsAt(move(college_candidate, file(pt), ready_for_approval(pt)),1).
holdsAt(move(ready_for_approval(pt), approved(pt)&approval(pt), prep_math_tutorial1),2).
holdsAt(move(approved(pt), write(application), theor_physics_module),3).
holdsAt(move(start(prep_math_tutorial1), complete(prep_math_tutorial), start(theor_physics_module3)),4).
holdsAt(move(knowledge_of_basic_physics, complete(theor_physics_module),5). holdsAt(stage(you, college_candidate),6).
happensAt(agent_in_state(you, file(pt))),6).
happensAt(agent_in_state(you, approved(pt)),7).
Annotation
not holdsAt(stage(you, complete(theor_physics_module3),6).
holdsAt(stage(you, college_candidate),8).

-continued

```
not holdsAt(stage(you, prep_math_tutorial),8).
Mode declarations
head(initiatedAt(stage(+arg₁,+arg₂),+time))
head(terminatedAt(stage(+arg₁,+arg₂),+time))
body(happensAt(agent_in_state (+arg₁,+ arg₁),+time))
body(holdsAt(stage(+arg₁,+arg₂),+time))
body(holdsAt(move(+arg_state₁, +action, +arg_state₂),+time))
Background Knowledge: axioms of event calculus
Output: learned clauses
initiatedAt(stage(X, Y ), T) ← happensAt(stage(X, D), T), holdsAt
(move(Y, Z, D), T), holdsAt(stage(X, Z), T).
terminatedAt(agent_in_state(X, Y ), T) ← happensAt(stage(X, D), T).
```

In the task described in Table 3, each example first describes the relative positions of several places and then asks a question about moving from one place to another. The answer to the question is then a sequence of directions. For the question 'How do you go from the state of an school applicant to the graduation of theoretical physics course?' the answer enumerates the actions needed to be committed.

Given such an example, the ontology builder 202 learns how navigating through states towards a desired state with respect to the particular transition between these states. A natural language text is first translated from AMR to the syntax of ASP. However, in this task the background knowledge B also contains the rules learned from the situational representation.

Table 3 above shows the corresponding ILP task for the example of path finding and the hypothesis generated by the XHAIL algorithm. This example illustrates how the task of path finding can be easily learned when a formal representation is used.

A hypothesis that can partially explain the data may be chosen in examples where the acquired rule does not work for every annotation. For example, consider the training set below.

```
Training Set:
Lily is a frog.
Julius is a swan.
Julius is green.
Lily is grey.
Greg is a swan.
Q: What color is Greg? green
```

If a hypothesis that can characterize the entire training data with the given set of available predicates cannot be found (as would be the case given the training set above) a hypothesis can be chosen that partially explains the data. Such a hypothesis can be derived by ignoring the examples in the training data which resulted in a failure. The resulted hypothesis is as follows:

holdsAt(color(X,C),T) ← holdsAt(domain(Z,D),T), holdsAt(color(Z,C),T), holdsAt(domain(X,D),T).

The above rule indicates that X has color C at time T if there exists a Z that is of type D and has color C at time point T, where X is also of type D. This rule covers more than 96% of test set cases. However, it does not cover the examples of following kind where there are two different entity of type D having two different colors (Table 4).

TABLE 4

| Error sample A | Error sample B |
| --- | --- |
| Lily is a frog. | Lily is a rhino. |
| Brian is a frog. | Lily is yellow. |
| Greg is frog. | Bernhard is a frog. |
| Lily is yellow. | Bernhard is white. |
| Julius is a frog. | Brian is a rhino. |
| Brian is grey. | Greg is a rhino. |
| Julius is grey. | Greg is yellow. |
| Greg is grey. | Julius is a rhino. |
| Bernhard is a frog. | Julius is green. |
| Q: What color is | Q: What color is |
| Bernhard? A: grey | Brian? |
|  | A: green |

For the error case A, the acquired clause will produce two answers stating that Bernhard has the color grey and yellow. Since, the most frogs are grey, one may assume that the correct clause should produce the color that has appeared maximum number of times for that type (here, frog). However, error case B contradicts this hypothesis. There are two yellow rhino and one grey rhino and the color of Brian which is a rhino is grey. The actual derived clause is the one that determines the color on the basis of the latest evidence.

Returning to FIG. 2, at real time, a complex multi-hop question (also called a complex query) may be received at 208 (e.g., by the autonomous agent application 108 of FIG. 1). As discussed above, the complex multi-hop question may include more than one search parameters. Said another way, the complex multi-hop question may be a query that can be formulated as multiple questions. By way of example, the complex query may be "What is the Annual Yield of the financial product that is available for CA residents, has 401K-type tax restrictions and requires direct deposit from your employer?"

At 210, the receiver (e.g., the autonomous agent application 108) generates an AMR representation of the received complex question. At 212, the complex question can be decomposed into a number of simple queries. By way of example, the AMR representation of the complex question can be utilized to identify one or more clauses of the complex question where each clause corresponds to a simple query (e.g., a query having a single search parameter). An example of identifying clauses from an AMR representation of a complex question is depicted in FIG. 4. Another method for decomposing the complex question may include generating a discourse tree for the user query. In some embodiments, the discourse tree includes a set of nodes and edges. The set of nodes may include terminal and nonterminal nodes. Terminal nodes individually represent a elementary discourse unit, and nonterminal nodes indicate rhetorical relationships between the nodes. By traversing the discourse tree generated for the complex question, two or more simple queries may be identified based at least in part on a predefined set of rules for identifying simple queries in discourse trees.

At 214, a simple query can be executed utilizing a number of search techniques. For example, at 216, the simple search query can be used to retrieve information for a local search (e.g., a search performed on the formal ontology/facts previously built by the ontology builder 202 as described in connection with FIG. 3. At 218, the autonomous agent application 108 may assess the similarity between a candidate search result and the simply query executed at 214. In some embodiments, the entity association module 204 may be utilized to assess the similarity between a candidate search result and the simple query.

In some embodiments, the entity association module 204 may be configured to associate various phrases with one another. One of the major bottleneck for finding relevant answers in MRC is associating phrases in context. For example, can an answer with the phrase 'pay for a tuition' be relevant for a question with a phrase 'draw a check'. How to establish similarity between these phrases in a context of a Q and an A?. This is usually considered a reasoning problem: this is not about a similarity between two phrases but rather if one can imply another. To learn if such implication exists, the entity association module 204 may be configured to determine if a first phrase can be implied by the second phrase in a document which would contain a cue that there is an implication between these phrases. One way to find such a document for an arbitrary pair of phrases is to utilize web mining.

Figure 5:
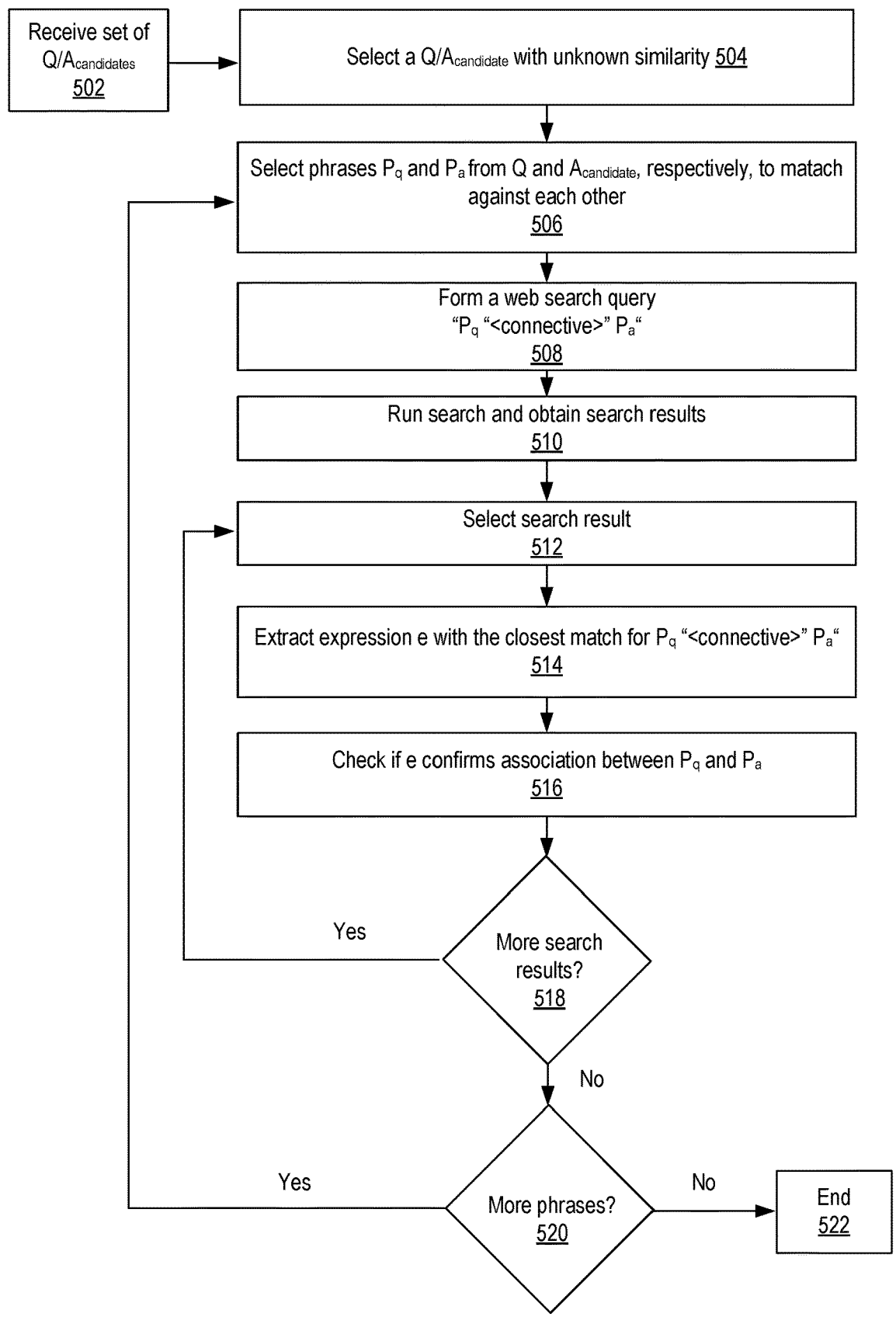
FIG. 5 depicts a flow diagram of an example method for confirming an association between two phrases (e.g., a simple query and a candidate answer), in accordance with at least one embodiment.

FIG. 5 depicts a flow diagram of an example method 500 for confirming an association between two phrases (e.g., a simple query and phrase of a candidate answer), in accordance with at least one embodiment. The method 500 may be performed by the entity association module 204 of FIG. 2.

A set of question/answer candidates may be provided at 502. In the context of FIG. 2, the pairs may include the simple query executed at 214 and each candidate answer identified (e.g., from the formal ontology generated by the ontology builder 202 of FIG. 2 in accordance with FIG. 3).

At 504, a particular simple query/candidate answer pair with unknown similarity may be selected. Steps 506-520 may be performed for each candidate pair in the set of question/answer candidates.

At 506, a phrase of the Q, $P_q$ (e.g., the whole simple query), and a phrase of the candidate answer selected at 504, $P_a$ (e.g., the first phrase of the candidate answer), may be selected to match against each other.

At 508, a web search query may be formed using any suitable number of connectives. By way of example, a search query can be formed based on the format "$P_q$ "<connective>" $P_a$". A data store of previously determined connectives (not depicted) may be utilized. Some connectives may include words that indicate actions, states, causes, conclusions, and so forth.

At 510, the search query formed at 508 may be executed. In some embodiments, this execution may include submitting the search query via a web search engine application programming interface. A set of results related to the web search query may be obtained in this manner.

At 512, a search result may be selected (e.g., a first search result, a next search result, etc.).

At 514, the query "$P_q$ "<connective>" $P_a$" may be compared to each expression of the search result to extract expression e that is the closest match to the query.

At 516, the expression e extracted at 514 may be utilized to confirm whether there is an association between $P_q$ and $P_a$.

At 518, if more search results are available, the method may return to 512 where a next search result may be selected and steps 514-518 repeated.

When there are no more search results the method may proceed from 518 to 520. If there are more phrases in current candidate answer, the method may return to 506 where a next phrase of the candidate answer may be selected and steps 506-518 repeated.

When no more phrases are available for the candidate answer, and assuming there are no other candidate answers, the method 500 may end at 522. If there are more candidate answers, 504 may be repeated any suitable number of times corresponding to the remaining number of candidate answers.

Returning to FIG. 2, at 220 once the entity association module 204 has been utilized to assess the similarity between candidate search results and the simple query, value may be extracted from the search result selected as being most similar to the query. In some embodiments, the autonomous agent application 108 may score each similar candidate search result that was deemed to be similar to the query and select one as being the most similar based on the score. An answer for the simple query may be extracted from the search result.

In addition to, or in lieu of executing the simple query against a local database (e.g., the ontology built by the ontology builder 202), the simple query can be executed at 224 with a web search API to obtain a set of web results.

At 226, machine reading comprehension module 206 may be utilized to extract value from the web search results. By way of example, In addition to, or in lieu of executing the simple query against a local database (e.g., the ontology built by the ontology builder 202) and/or using the web search API, formal reasoning can be used with the ontology build by the ontology builder 202 to find values (e.g., an answer to the simple query).

At 228, a value (e.g., an answer) obtained for the simple query may be substituted into the next simple query formed through the decomposition process at 212 and the process may return to 214 where an answer may be obtained for the next simple query with the substituted value based at least in part on any suitable combination of 1) executing the next simple query with the substituted value against a local database in which steps 216-220 may be repeated, 2) next simple query with the substituted value with a web search API where steps 224-226 may be repeated, or 3) utilizing formal reasoning with the previously built ontology and the next simple query with the substituted value. Steps 214-228 may be repeated any suitable number of times corresponding to the remaining number of simple queries obtained through the decomposition process discussed at 212.

At 230, the answers may be recomposed into a single answer and the recomposed answer may be provided at 232.

As a non-limiting example, a complex query could be q: 'What is Annual Yield of the financial product that is available for CA residents, has 401K-type tax restrictions and require direct deposit from your employer?'

Utilizing the techniques discussed above, the text complex query may be converted to the AMR of FIG. 4 from which three simple queries, q1, q2, and q3 may be obtained. These queries and their corresponding answer set are as follows:

q1: 'financial product available for CA residents?' {Annuity1, Annuity3_MoneyMarket} q2: 'financial product 401K-type tax restrictions?' {Annuity1, Annuity2CD, Annuity3_MoneyMarket} q3: 'financial product that requires direct deposit from your employer' { associated(Annuity2CD, Checking2), associated(Annuity1, Checking1), . . . deposit(employer, Checking2) product(Account) :- deposit(Employer, AccountAssoc), associated(AccountAssoc, Account), saving(Account). }

A search engine and a Q/A model may be utilized to answer the simple questions, from which a final answer A may be computed. Notice that the third simple question relies on a clause which can be learned from textual description of a financial product.

Recomposing the answers can be expressed by the following:

({ Annuity1, Annuity3_MoneyMarket} ∪ { Annuity1, Annuity2CD, Annuity3_MoneyMarket} ∪ { Annuity1}={ Annuity1})

Thus, an answer A may be determined by taking the intersection of the answers above (e.g., Annuity 1) and providing the corresponding annual yield.

FIG. 6 depicts a variety of types of complex multi-hop questions, in accordance with at least one embodiment. The table 600 includes the column on the left that indicates some of the complex multi-hop question types. In the corresponding cell of the right column, the complex query Q is indicated as well as phrases 1 and 2 (corresponding to two different simple queries derived from Q) from which the answer is derived.

As a non-limiting example, the first row of the table depicts a type of complex multi-hop question that may be answer through informal reasoning identifying a bridge entity to complete the $2^{nd}$ hop question. For example, Q, the complex query may be "Which rocket was used to launch the first human in space?" The complex query Q may be decomposed into two simple queries SQ1 (Who was the first human launched in space?) and SQ2 (Which rocket was used to launch the first human). SQ1 may be executed (e.g., via a web search API) to obtain an answer from the phrase P1: "The USSR launched the first human in space, Yuri Gagarin . . . ". "Yuri Gagarin" may be selected from the set of search results based at least in part on being a common term found among the search results. In some embodiments, identifying a common term of search results may comprise performing a pair-wise generalization of pairs of the search results. "Yuri Gagarin" may then be used as a substitute value of SQ2. For example SQ2, as modified with the answer from SQ1 may be "Which rocket was used to launch Yuri Gagarin?" SQ2 may be executed (e.g., via a web search API) to obtain an answer from the phrase P2: "Yuri Gagarin was launched into a single orbit on a Vostok 3KA rocket, on 12 Apr. 1961 . . . ". "Vostok 3KA rocket" may be selected from the set of search results based at least in part on being a common term found among the search results. Thus, "Vostok 3KA rocket" may be provided as the answer to the complex query.

In some embodiments, multiple common terms may be found among the search results. In those cases, the common terms may be substituted for one or more portions of a subsequent query.

Figure 7:
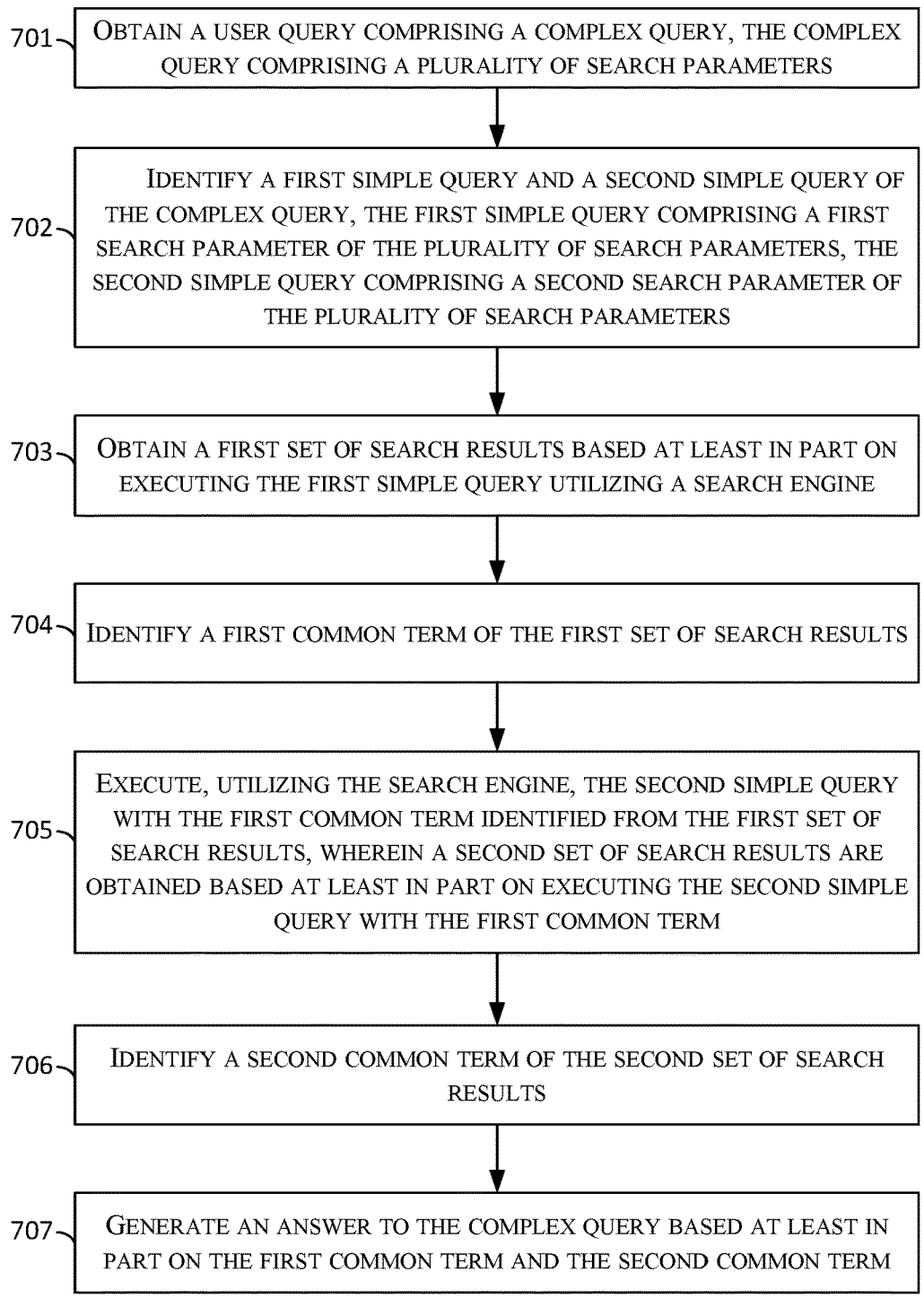
FIG. 7 depicts a flowchart illustrating an example of a method for generating an automated answer to a complex query, in accordance with at least one embodiment.

FIG. 7 depicts a flowchart illustrating an example of a method 700 for generating an automated answer to a complex query, in accordance with at least one embodiment. In some embodiments, the method 700 may be performed by the autonomous agent application 108 of FIG. 1.

The method 700 may begin at 701, where a user query comprising a complex query may be obtained. In some embodiments, the complex query comprises a plurality of search parameters.

At 702, a first simple query and a second simple query of the complex query may be identified (e.g., by decomposing the complex query in the manner discussed above). In some embodiments, the first simple query may comprise a first search parameter of the plurality of search parameters. In some embodiments, the second simple query may comprise a second search parameter of the plurality of search parameters.

At 703, a first set of search results may be obtained based at least in part on executing the first simple query utilizing a search engine. In some embodiments, utilizing the search engine may include submitting the first simple query to the search engine via a designated application programming interface (API). In some embodiments, the search engine may be locally provided to search a local data store (e.g., the ontology build by ontology builder 202 of FIG. 2).

At 704, a first common term of the first set of search results may be identified. For example, pairs of search results (or pairs of phrases of search results) may be compared to identify common terms.

At 705, utilizing the search engine, the second simple search query may be executed with the first common term identified from the first set of search results. In some embodiments, a second set of search results are obtained based at least in part on executing the second simple query with the first common term.

At 706, a second common term of the second set of search results may be identified. For example, pairs of the second set of search results (or pairs of phrases of search results) may be compared to identify common terms.

At 707, an answer to the complex query may be generated based at least in part on the first common term and the second common term as described in numerous examples above.

Figure 8:
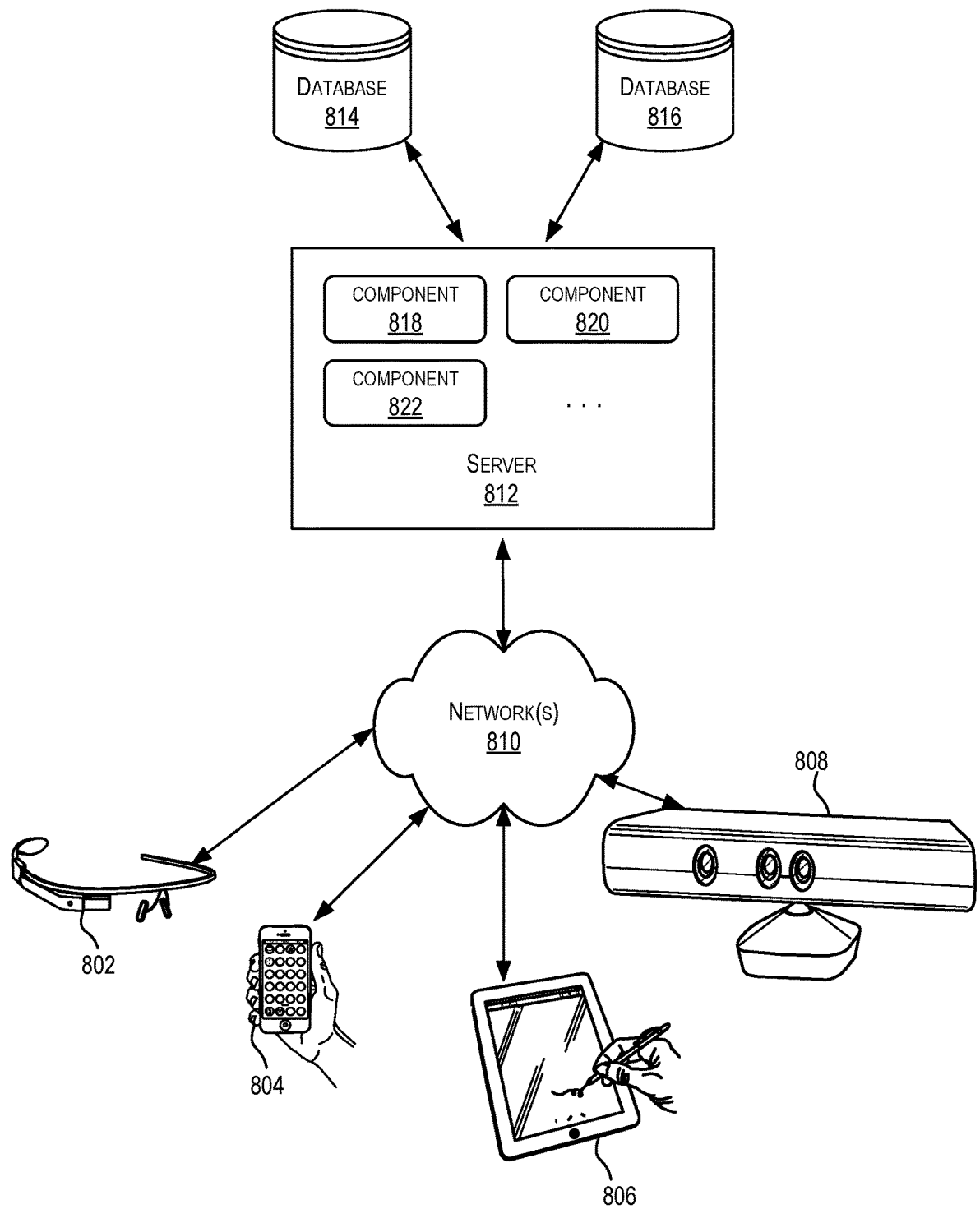
FIG. 8 depicts a simplified diagram of a distributed system for implementing one of the aspects.

FIG. 8 depicts a simplified diagram of a distributed system 800 for implementing one of the aspects. In the illustrated aspect, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network(s) 810.

In various aspects, server 812 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other aspects, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The aspect shown in the figure is thus one example of a distributed system for implementing an aspect system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various aspects, server 812 may be adapted to run one or more services or software applications described in the foregoing disclosure. For example, server 812 may correspond to a server for performing processing described above in accordance with an aspect of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of aspects, databases 814 and 816 may reside in a storage-area network (SAN). Similarly, any necessary files for performing the functions attributed to server 812 may be stored locally on server 812 and/or remotely, as appropriate. In one set of aspects, databases 814 and 816 may include relational databases, such as databases provided by Oracle, that are adapted to store, update, and retrieve data in response to SQL-formatted commands.

Figure 9:
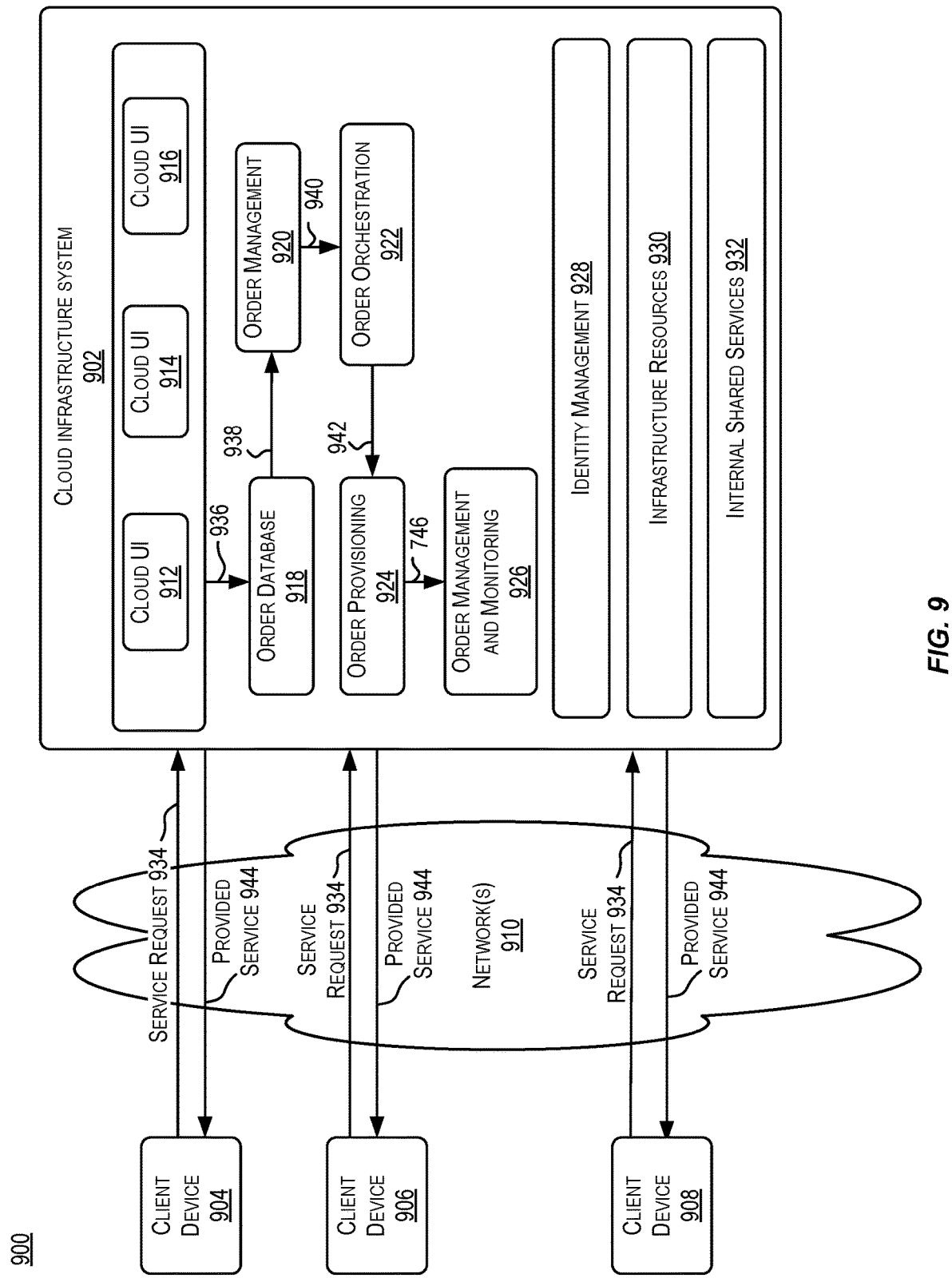
FIG. 9 is a simplified block diagram of components of a system environment by which services provided by the components of an aspect system may be offered as cloud services in accordance with an aspect.

FIG. 9 is a simplified block diagram of one or more components of a system environment 900 (e.g., a cloud infrastructure system) by which services provided by one or more components of an aspect system may be offered as cloud services, in accordance with an aspect of the present disclosure. In the illustrated aspect, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the aspect shown in the figure is only one example of a cloud infrastructure system that may incorporate an aspect of the invention. In some other aspects, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808 of FIG. 8.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between client computing devices 904, 906, and 908 and cloud infrastructure system 902. Each network may be any type of network familiar to those skilled in the art that can support data communications using any of a variety of commercially-available protocols, including those described above for network(s) 910.

Cloud infrastructure system 902 may comprise one or more computers and/or servers that may include those described above for server 812 of FIG. 8.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some aspects, the services provided by cloud infrastructure system 902 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some aspects, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 902 may also include infrastructure resources 930 for providing the resources used to provide various services to customers of the cloud infrastructure system. In one aspect, infrastructure resources 930 may include pre-integrated and optimized combinations of hardware, such as servers, storage, and networking resources to execute the services provided by the PaaS platform and the SaaS platform.

In some aspects, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 902 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 902, and the like.

In one aspect, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client computing devices 904, 906 or 908, may interact with cloud infrastructure system 902 by requesting one or more services provided by cloud infrastructure system 902 and placing an order for a subscription for one or more services offered by cloud infrastructure system 902. In certain aspects, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 in which the customer intends to subscribe.

After an order has been placed by the customer, the order information is received via the cloud UIs, 912, 914 and/or 916.

At operation 936, the order is stored in order database 918. Order database 918 can be one of several databases operated by cloud infrastructure system 902 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain aspects, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by system environment 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client computing devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain aspects, system environment 900 may include an identity management module 928. Identity management module 928 may be configured to provide identity services, such as access management and authorization services in system environment 900. In some aspects, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.). Identity management module 928 may also include the management of descriptive information about each customer and about how and by whom that descriptive information can be accessed and modified.

Figure 10:
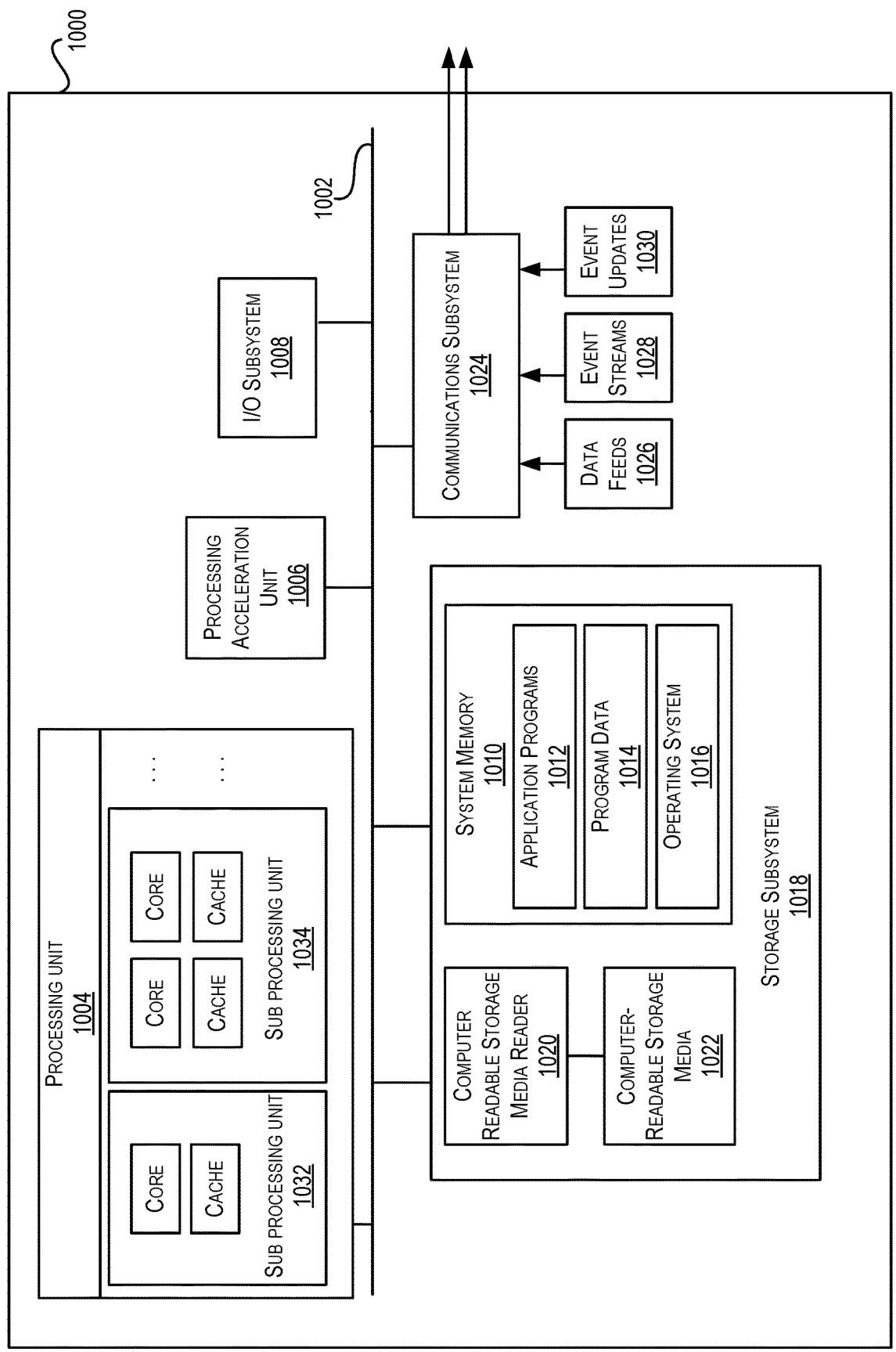
FIG. 10 illustrates an exemplary computer system, in which various aspects may be implemented.

FIG. 10 illustrates an exemplary computer system 1000, in which various aspects may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative aspects of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain aspects, processing unit 1004 may be implemented as one or more independent processing units 1032 and/or 1034 with single or multicore processors included in each processing unit. In other aspects, processing unit 1004 may also be implemented as a quad-core processing unit formed by integrating two dual-core processors into a single chip.

In various aspects, processing unit 1004 can execute a variety of programs in response to program code and can maintain multiple concurrently executing programs or processes. At any given time, some or all of the program code to be executed can be resident in processing unit 1004 and/or in storage subsystem 1018. Through suitable programming, processing unit 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some aspects. Software (programs, code modules, instructions) that when executed by a processor provide the functionality described above, may be stored in storage subsystem 1018. These software modules or instructions may be executed by processing unit 1004.

Storage subsystem 1018 may also provide a repository for storing data used in accordance with the present invention.

Storage subsystem 1018 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some aspects, communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1024 can provide wired network connectivity (e.g., Ethernet) in addition to or instead of a wireless interface.

In some aspects, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive unstructured data feeds 1026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of generating an automated answer to a complex query, the method comprising:
   obtaining a user query comprising the complex query, the complex query comprising a plurality of search parameters;
   identifying a first simple query of the complex query and a second simple query of the complex query, the first simple query comprising a first search parameter of the plurality of search parameters, the second simple query comprising a second search parameter of the plurality of search parameters, wherein identifying the first simple query and the second simple query includes: i) generating an abstract meaning representation for the user query to identify the first simple query and the second simple query, or ii) generating a discourse tree for the user query to identify the first simple query and the second simple query;
   obtaining a first set of search results based at least in part on executing the first simple query utilizing a search engine;
   identifying a first common term of the first set of search results;
   executing, utilizing the search engine, the second simple query with the first common term identified from the first set of search results, wherein a second set of search results are obtained based at least in part on executing the second simple query with the first common term;
   identifying a second common term of the second set of search results; and
   generating the automated answer to the complex query based at least in part on the first common term and the second common term.

2. The method of claim 1, further comprising inserting the first common term in the second simple query prior to executing the second simple query utilizing the search engine.

3. The method of claim 1, wherein identifying the first simple query and the second simple query includes:
   generating the abstract meaning representation for the user query, the abstract meaning representation comprising a directed acyclic graph comprising a plurality of nodes and edges that specify a semantic representation of the user query; and
   traversing the abstract meaning representation generated for the user query, wherein the first simply query and the second simple query are identified based at least in part on a predefined set of rules and the traversing.

4. The method of claim 3, further comprising identifying one or more clauses from the abstract meaning representation, each of the one or more clauses having a subject and predicate, wherein the traversing of the abstract meaning representation includes parsing the one or more clauses.

5. The method of claim 1, wherein identifying the first simple query and the second simple query includes:
   generating the discourse tree for the user query, the discourse tree comprising a set of nodes and edges, wherein the set of nodes comprise terminal and nonterminal nodes, wherein terminal nodes individually represent an elementary discourse unit, and wherein the nonterminal nodes indicate rhetorical relationships between the set of nodes; and
   traversing the discourse tree generated for the user query, wherein the first simply query and the second simple query are identified based at least in part on a predefined set of rules and the traversing.

6. The method of claim 1, wherein identifying the first common term comprises performing a pair-wise generalization of pairs of the first set of search results.

7. The method of claim 1, wherein the first simple query and the second simple query are executed utilizing a web application programming interface.

8. The method of claim 1, wherein identifying the first common term comprises performing a pair-wise generalization of pairs of the first set of search results.

9. A computing device configured to generate an automated answer to a complex query, the computing device comprising:
   a computer-readable medium storing non-transitory computer-executable program instructions; and
   a processing device communicatively coupled to the computer-readable medium for executing the non-transitory computer-executable program instructions, wherein executing the non-transitory computer-executable program instructions with the processing device causes the computing device to perform operations comprising:
      obtaining a user query comprising the complex query, the complex query comprising a plurality of search parameters;
      identifying a first simple query of the complex query and a second simple query of the complex query, the first simple query comprising a first search parameter of the plurality of search parameters, the second simple query comprising a second search parameter of the plurality of search parameters, wherein identifying the first simple query and the second simple query includes: i) generating an abstract meaning representation for the user query to identify the first simple query and the second simple query, or ii) generating a discourse tree for the user query to identify the first simple query and the second simple query;

obtaining a first set of search results based at least in part on executing the first simple query utilizing a search engine;

identifying a first common term of the first set of search results;

executing, utilizing the search engine, the second simple query with the first common term identified from the first set of search results, wherein a second set of search results are obtained based at least in part on executing the second simple query with the first common term;

identifying a second common term of the second set of search results; and generating the automated answer to the complex query based at least in part on the first common term and the second common term.

10. The computing device of claim 9, further comprising inserting the first common term in the second simple query prior to executing the second simple query utilizing the search engine.

11. The computing device of claim 9, wherein identifying the first simple query and the second simple query includes:
generating the abstract meaning representation for the user query, the abstract meaning representation comprising a directed acyclic graph comprising a plurality of nodes and edges that specify a semantic representation of the user query; and
traversing the abstract meaning representation generated for the user query, wherein the first simply query and the second simple query are identified based at least in part on a predefined set of rules and the traversing.

12. The computing device of claim 11, further comprising identifying one or more clauses from the abstract meaning representation, each of the one or more clauses having a subject and predicate, wherein the traversing of the abstract meaning representation includes traversing the one or more clauses.

13. The computing device of claim 9, wherein identifying the first simple query and the second simple query includes:
generating the discourse tree for the user query, the discourse tree comprising a set of nodes and edges, wherein the set of nodes comprise terminal and nonterminal nodes, wherein terminal nodes individually represent a elementary discourse unit, and wherein the nonterminal nodes indicate rhetorical relationships between the set of nodes; and
traversing the discourse tree generated for the user query, wherein the first simply query and the second simple query are identified based at least in part on a predefined set of rules and the traversing.

14. The computing device of claim 9, wherein identifying the first common term comprises performing a pair-wise generalization of pairs of the first set of search results.

15. The computing device of claim 9, wherein the first simple query and the second simple query are executed utilizing a web application programming interface.

16. A non-transitory computer-readable storage medium storing computer-executable program instructions for generating an automated answer to a complex query, wherein when executed by a processing device, the computer-executable program instructions cause the processing device to perform operations comprising:

obtaining a user query comprising the complex query, the complex query comprising a plurality of search parameters;

identifying a first simple query of the complex query and a second simple query of the complex query, the first simple query comprising a first search parameter of the plurality of search parameters, the second simple query comprising a second search parameter of the plurality of search parameters, wherein identifying the first simple query and the second simple query includes: i) generating an abstract meaning representation for the user query to identify the first simple query and the second simple query, or ii) generating a discourse tree for the user query to identify the first simple query and the second simple query;

obtaining a first set of search results based at least in part on executing the first simple query utilizing a search engine;

identifying a first common term of the first set of search results;

executing, utilizing the search engine, the second simple query with the first common term identified from the first set of search results, wherein a second set of search results are obtained based at least in part on executing the second simple query with the first common term;

identifying a second common term of the second set of search results; and generating the automated answer to the complex query based at least in part on the first common term and the second common term.

17. The non-transitory computer-readable storage medium of claim 16, further comprising inserting the first common term in the second simple query prior to executing the second simple query utilizing the search engine.

18. The non-transitory computer-readable storage medium of claim 16, wherein identifying the first simple query and the second simple query includes:
generating the abstract meaning representation for the user query, the abstract meaning representation comprising a directed acyclic graph comprising a plurality of nodes and edges that specify a semantic representation of the user query; and
traversing the abstract meaning representation generated for the user query, wherein the first simply query and the second simple query are identified based at least in part on a predefined set of rules and the traversing.

19. The non-transitory computer-readable storage medium of claim 18, further comprising identifying one or more clauses from the abstract meaning representation, each of the one or more clauses having a subject and predicate, wherein the traversing of the abstract meaning representation includes traversing the one or more clauses.

20. The non-transitory computer-readable storage medium of claim 16, wherein identifying the first simple query and the second simple query includes:
generating the discourse tree for the user query, the discourse tree comprising a set of nodes and edges, wherein the set of nodes comprise terminal and nonterminal nodes, wherein terminal nodes individually represent an elementary discourse unit, and wherein the nonterminal nodes indicate rhetorical relationships between the set of nodes; and traversing the discourse tree generated for the user query, wherein the first simply query and the second simple query are identified based at least in part on a predefined set of rules and the traversing.

\* \* \* \* \*

UNITED STATES PATENT AND TRADEMARK OFFICE
CERTIFICATE OF CORRECTION

| | | |
|---|---|---|
| PATENT NO. | : 11,386,176 B2 | Page 1 of 1 |
| APPLICATION NO. | : 16/983993 | |
| DATED | : July 12, 2022 | |
| INVENTOR(S) | : Boris Galitsky | |

It is certified that error appears in the above-identified patent and that said Letters Patent is hereby corrected as shown below:

In the Drawings

On sheet 5 of 10, in FIG. 5, under Reference Numeral 506, Line 1, delete "matach" and insert -- match --, therefor.

In the Specification

In Column 6, Line 48, delete "arguments" and insert -- argument s --, therefor.

In Column 7, Line 21, delete "(generlization-based)" and insert -- (generalization-based) --, therefor.

In Column 8, Line 12, delete "of" and insert -- of $\Delta$ --, therefor.

In Column 10, Line 64, delete "simply" and insert -- simple --, therefor.

In the Claims

In Column 26, Line 16, in Claim 3, delete "simply" and insert -- simple --, therefor.

In Column 26, Line 34, in Claim 5, delete "simply" and insert -- simple --, therefor.

In Column 27, Line 36, in Claim 11, delete "simply" and insert -- simple --, therefor.

In Column 27, Line 55, in Claim 13, delete "simply" and insert -- simple --, therefor.

In Column 28, Line 48, in Claim 18, delete "simply" and insert -- simple --, therefor.

In Column 29, Line 2, in Claim 20, delete "simply" and insert -- simple --, therefor.

Signed and Sealed this
Twenty-seventh Day of December, 2022

Katherine Kelly Vidal
*Director of the United States Patent and Trademark Office*